April 14, 1959
L. C. MORTON ET AL
2,881,728
PRESSURE-APPLYING FIXTURE
Filed Oct. 12, 1955
3 Sheets-Sheet 3
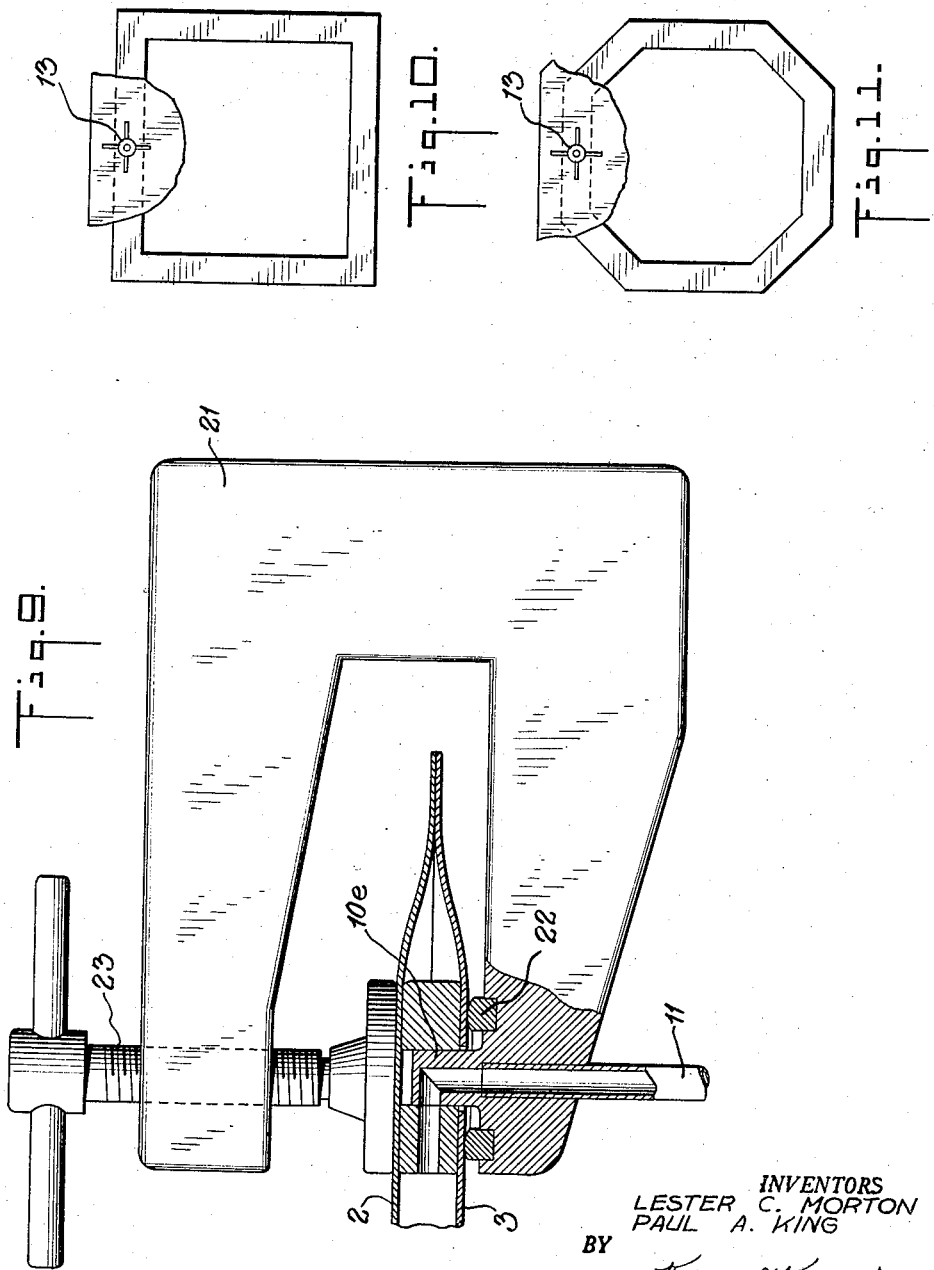
INVENTORS
LESTER C. MORTON
PAUL A. KING
BY
ATTORNEYS

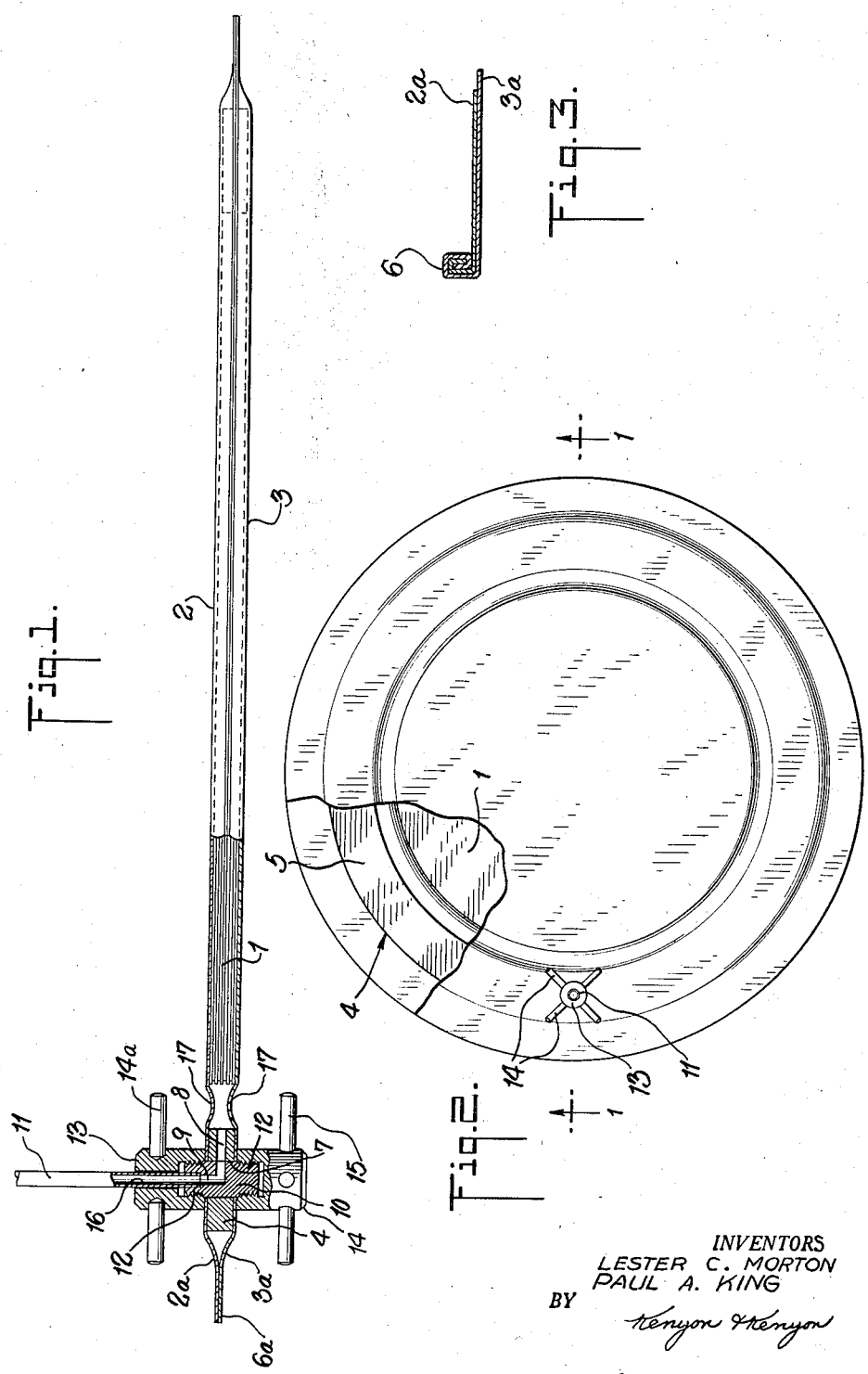

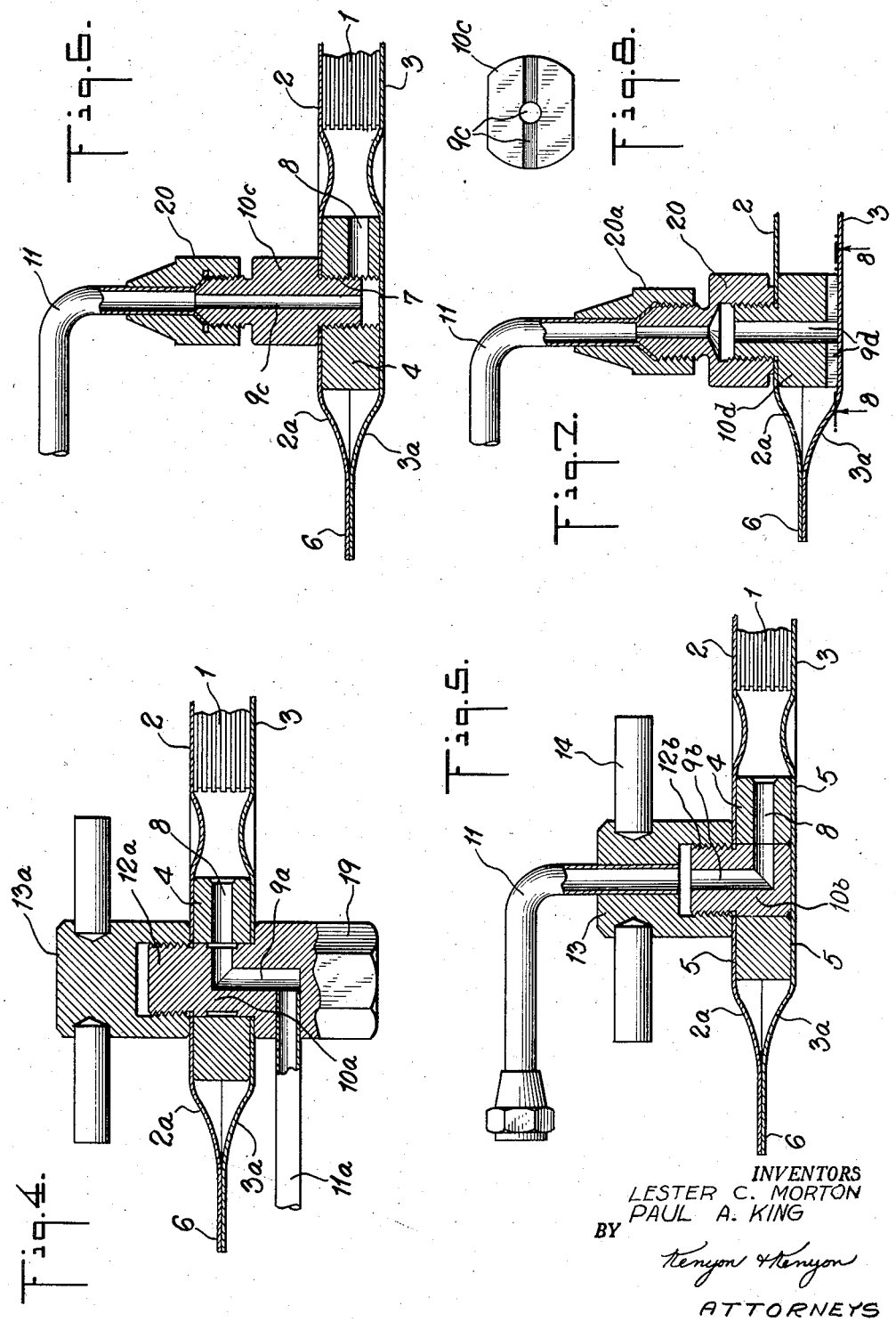

United States Patent Office 2,881,728
Patented Apr. 14, 1959

2,881,728

PRESSURE-APPLYING FIXTURE

Lester C. Morton, Trumbull, and Paul A. King, Stratford, Conn., assignors to Bridgeport Brass Company, Bridgeport, Conn., a corporation of Connecticut Application October 12, 1955, Serial No. 540,072

2 Claims. (Cl. 113—59)

This invention relates to a pressure-applying fixture particularly adapted for use in connection with brazing together two or more layers of metal. For example, the fixture is particularly useful in connection with applying brazing pressure and heat to the different layers required to produce cladmetal layers.

Cladmetal is now being produced commercially by superimposing the separate metal layers or laminations, with brazing powder positioned therebetween, to form an assembly, a plurality of these assemblies being stacked and placed within a fixture. This fixture provides diaphragms located on opposite sides of the assembly or stack of assemblies, these diaphragms being made of metal of a sufficiently thin gauge to be flexed by the atmospheric pressure. The enclose is substantially air-tight so that by evacuating the enclosure the two diaphragms press oppositely on the assembly or stack of assemblies. The result is a unit which may be handled easily without various laminations or layers becoming displaced even when the fixture is positioned in a vertical plane. The vacuum is maintained continuously and the fixture may be immersed in a molten salt bath to apply the brazing heat while the atmospheric pressure maintains the the necessary brazing pressure. Furthermore, the thinness of the diaphragms and the fact that the laminations or layers are pressed tightly together, gets the heat into the assembly or stack of assemblies very rapidly. After brazing, the fixture and its enclosed work may be cooled rapidly by immersing the fixture in a liquid quench bath. In other words, the heat transfer is rapid in both directions.

Although the fixtures that have been used for the above purpose have produced satisfactory commercial results, it is desirable to keep the mass of such a fixture to the minimum consistent with its intended purpose. Furthermore, it is desirable to keep the cost of the fixture at a minimum.

One of the objects of the present invention is to provide a fixture, adapted for the above use, which is made of as little metal as possible, whereby to increase rapidity of the heat exchange and to decrease the weight and cost of the fixture. Another object is to provide a fixture which may be sealed more air-tightly than those heretofore in use. Still another object is to provide the described type of fixture in a form which permits it to be sealed rapidly by commercially available equipment and in a permanent manner, it being understood that the two diaphragms, mentioned above, may be made from relatively inexpensive plain-carbon steel so that they can be discarded as scrap after each use. In this connection, when using the prior art devices the vacuum and the thermal effects deform the diaphragms so that usually they are discarded as scrap after each use.

A specific example of the present invention is illustrated by the accompanying drawings wherein:

Fig. 1 is a side view or elevation with one end portion sectioned in a vertical plane to expose the details;

Fig. 2 is a top view, on a reduced scale, with a portion broken away to expose the inner elements;

Fig. 3 is a cross sectioned portion of Fig. 1 showing a modification with respect to the manner in which the diaphragms are sealed together;

Fig. 4 is similar to Fig. 1 excepting that it shows only the one sectioned end portion and illustrates a modification;

Fig. 5 is similar to Fig. 4 excepting that it shows another modification;

Fig. 6 again is similar but shows still another modification;

Fig. 7 shows the same sectioned end portion to illustrate a further modification;

Fig. 8 is a bottom view taken on the line 8—8 in Fig. 7;

Fig. 9 shows the sectioned end portion but looking in an opposite direction and serves to illustrate an even further modification;

Fig. 10 is a view generally similar to Fig. 2 but shows a modification of the shape of the device; and Fig. 11 is like Fig. 10 but suggests still another possible shape and thus represents another modification.

In these drawings the stack of assemblies 1, enclosed by the fixture, are of the character described. For example, each assembly, of the stack, may comprise a copper layer and a stainless steel layer, or a copper layer and two stainless steel layers, one on each side of the copper. The layers are of sheet metal gauges and are flexible under atmospheric pressure. In some cases there may be only a single assembly comprising a base plate too thick to flex under atmospheric pressure but having a cladding layer or layers that are thin enough to flex under such pressure and conform to the shape of the base plate. Brazing metal and flux are located between the surfaces to be bonded together to produce the cladmetal, this being done prior to superimposing the layers of each assembly. Production of the finished cladmetal requires the application of brazing heat and pressure, and the pressure should be applied so as to cause all of the surfaces, to be interbrazed, to conform in shape with each other. The assemblies are not stacked so high as to prevent the entire stack from having a flexing action throughout its height or thickness. In the case of thick base products clad on one side only, two such assemblies may be stacked with cladding layers facing the diaphragms.

The fixture comprises superimposed interspaced diaphragms 2 and 3, each made of sheet metal of a sufficiently light gauge to be flexible under atmospheric pressure. Ordinary plain-carbon steel may be used for these diaphragms 2 and 3.

The outer or peripheral portions 2a and 3a, of the diaphragms 2 and 3, respectively, are bent or formed or shaped so that they approach each other radially outwardly until they intercontact directly, each peripheral portion extending outwardly far enough, while they intercontact to provide an interseaming area or annulus. A metal ring 4 is located between the diaphragms adjacent to the peripheral portions 2a and 3a. This ring 4 may have a thickness substantially equalling the thickest or highest stack of assemblies contemplated, this ring having flat end surfaces 5 and functioning as a strut strutting apart the two diaphragms 2 and 3 adjacent to their peripheral portions 2a and 3a.

In using the fixture, as described so far, the stack of assemblies 1 is placed between the diaphragms 2 and 3 which may initially comprise flat sheets of inexpensive plain-carbon steel. The ring 4 is arranged so that it encircles the stack 1 prior to placement of the sheets 2 and 3. For example, the diaphragm 3, as a flat sheet, may be placed on a support, the ring 4 then superimposed on this sheet, the stack of assemblies next located within the ring on top of the sheet and, finally, the other diaphragm 2, also in the form of a flat sheet, placed on top of everything.

The portions 2a and 3a should overhang outwardly of the ring 4 far enough to permit the seaming or sealing. This operation may be effected easily by the use of electric resistance welding methods. For example, two rollers may be arranged to pinch the overhanging portions 2a and 3a together and by powering these rollers, applying electric current of suitable voltage to the rollers, and by guiding the fixture, which is circular, of course, may be formed quickly and easily. Machinery is available for making a mechanical seam in this same general fashion, and this type of equipment may also be used, whereby to produce a mechanically interlocked seam 6 as shown by Fig. 3. In the case of the welded seam a flat annular fin 6a is formed, as shown by Fig. 1, the interfaces of the portions 2a and 3a being interwelded. In both instances a substantially permanent seam is formed, thus making it easier to obtain air-tightness, than when relying on interfitting surfaces of a separable nature.

The necessary connection with the vacuum source is provided by forming a common bore 7 through the two diaphragms 2 and 3 and the ring 4. This bore extends from end to end of the ring 4 and is in the form of holes through the diaphragm sheets 2 and 3 which register with the bore through the ring 4. The ring 4 also is formed with a radial bore 8 which connects the inner periphery of the ring 4 with a passage 9 formed, as a right angular passage, through a plug 10 which fits through the bore 7. After the seaming or sealing, this plug 10 may be positioned through the bore 7 with the bores or passages 8 and 9 inter-registered. A suitable seamless metal tube 11 connects with the transversely extending or outwardly opening end of the passage 9 and is firmly and permanently fixed to the plug 10, as by welding. This tube does not interfere with the placement of the plug 10 in the fixture.

Threaded nipples or projecting ends 12, formed as integral parts of the plug 10, project oppositely beyond the outer surfaces of the diaphragms 2 and 3 when the plug 10 is in position, and nuts 13 and 14, preferably provided with handles 14a and 15, respectively, are screwed on these nipples or threaded projecting parts so as to firmly and tightly engage the outer surfaces of the diaphragms 2 and 3 opposite to the ring 4. The nut 13 is provided with a bore 16 for passing the tube 11. It can be seen that after the seaming or sealing operation, the plug 10 is simply pushed into place, and the nuts 13 and 14 are tightened, these nuts together with the strutting ring 4 clamping the adjacent portions of the two diaphragms firmly between them in the fashion of vises.

When the vacuum is drawn by connecting the tube 11 to a suitable vacuum source, the two flexible sheets 2 and 3, functioning as diaphragms, apply the atmospheric pressure to the opposite surfaces of the stacked assemblies 1. The atmospheric pressure bends down the portions 2a and 3a as shown, and because the ring 4 has a larger inside diameter than the lateral dimensions or diameters of the assemblies 1, the resulting annular space permits the diaphragms to draw inwardly, as generally shown at 17.

It can be seen that the minimum mass of metal is used by this fixture with the attendant advantages already described. The fixture may be immersed in a molten salt bath and later in a cool oil bath, to get the heat into and from the stack of assemblies very rapidly while the assemblies are maintained under the atmospheric pressure with their surfaces flexed into conformity with each other throughout the stack.

After the brazing operation, and the quenching, are finished, the fixture is cut open to remove the assemblies. Excepting for the diaphragms or sheets 2 and 3, everything may be reused.

In the foregoing the ring is considered as being a very short cylindrical strut and as having axial ends. These ends are the flat surfaces 5, which may also be called the sides of the ring if the ring is considered as being more in the nature of a washer. The passage through the plug 10 must connect the tube 11 with the inner periphery of the ring 4 and, therefore, with the inside of the fixture, its shape, otherwise, being not so important.

The details of construction illustrated by Figs. 1 and 2 are capable of modification. For example, in Fig. 4 the plug 10 of Fig. 1 is replaced by a plug 10a having a large hexagonal head 19 which engages the outside surface of the diaphragm 3 in the fashion of a bolt and nut. The passage 9a, of this modification, extends through the side of this head 19 so that the tube 11a may extend away from the fixture without interfering with the application of the nut 13a.

It can be seen that most of the parts of Fig. 4 correspond with those of Fig. 1 and corresponding numerals have been used for these parts, with identification provided by the use of identifying letters where this is necessary. This practice is followed hereinafter whenever it is appropriate.

In Fig. 5 the modification consists in making the plug 10b so that its lower end terminates flush with the lower face of the ring 4, these parts 4 and 10b being welded together to form an integral unit. This eliminates the need for forming any kind of hole through the diaphragm 3.

In Fig. 6 the plug 10c has a threaded lower end while the ring 4 has the bore 7, for this plug, internally threaded so that the plug may simply be screwed into this bore. In this case also there is no hole formed through the diaphragm 3. The tube 11 is connected with the plug 10c by a standard flared tube fitting 20.

Figs. 7 and 8 show that the ring 4 can be eliminated. In this case only the plug 10d is used, this being shouldered to strut apart only the adjacent portions of the diaphragms 2 and 3. The bore or passage 9d extends from the top of the plug 10d downwardly and gains access to the space between the diaphragms by way of a groove formed in the bottom of the plug's enlarged head. Fig. 8 shows the bottom of this head. This modification reduces the fixture to the two diaphragms and the plug and the tube connection.

In Fig. 9 a C-clamp 21 is used. This clamp is made to provide the plug 10e. The necessary hole for this plug is formed through the lower diaphragm 3, the upper diaphragm 2 being free from any hole. Fluid tightness is obtained by providing the lower jaw of the C-clamp 21 with a sealing ring 22 which surrounds the plug 10e. A conventional clamping screw 23 provides the pressure required to obtain a fluid-tight seal. This particular modification has the advantage that the C-clamp may be used conveniently as a hanger for the fixture. A hook operated by a chain hoist may be slipped through the C-clamp so that everything can be lifted conveniently.

In Fig. 2 the fixture is shown as having a circular contour because frequently the cladmetal shape desired is circular. The fixture of the present invention has the advantage that it may be designed with other shapes. Thus, Fig. 10 shows a square shape while Fig. 11 shows a polygonal shape. Various other shapes are, of course, possible.

In preparing any of these fixtures, it is possible to place a flat sheet of plain-carbon steel, which may be of the standard commercial rectangular shape, on a support. A stack or pile of cladmetal assemblies is then placed on top of this sheet. If the ring type of strut is used it is then placed on the sheet around the cladmetal components. Next a similar sheet of plain-carbon steel is placed on top of the ring and cladmetal components.

As previously indicated, in some instances the ring may be substituted by the plug 10c.

The above assembly of elements may then be placed between clamps which hold the assembly so that it may be rotated. These clamps may be provided in conjunction with a standard electric resistance welding edge seamer of the roller type in which case the rollers press the parts of the two steel sheets together which overhang. Of course, these diaphragm sheets should have an overall size sufficient to overhang far enough to permit them to be seamed together around the ring or plug and the cladmetal components. A mechanical seam may also be used. In all cases the seam should be substantially air-tight.

After the seaming the projecting parts of the diaphragm sheets may be trimmed off, for convenience in handling, from what now amounts to a package. The drawing of the vacuum causes the atmosphere to press down both diaphragms so as to compress the cladmetal components.

This resulting unit or package may next be immersed in a molten salt bath to effect the brazing, after which the unit or package may be quenched for rapid cooling. The heat may be placed into and withdrawn from the cladmetal components so rapidly as to permit metallurgical effects which are not otherwise possible.

We claim:

1. A fixture for a stack of cladmetal layers to be brazed together by heat under atmospheric pressure for flexing at least one layer on the end of said stack of layers to cause it to conform to the other during the brazing, said fixture comprising superimposed interspaced diaphragms, each made of sheet metal of a sufficiently light gauge to be flexible under atmospheric pressure, the outer peripheral portions of said diaphragms being formed so that they approach each other radially outwardly until they intercontact directly, each of said peripheral portions extending outwardly far enough while said peripheral portions extending outwardly far enough while they intercontact to form an interseaming area in the form of an annulus, a metal ring being located between the diaphragms adjacent to said peripheral portions and having a thickness substantially equalling said stack and having flat end surfaces strutting said diaphragms apart, and means for withdrawing air from the space between said diaphragms within said ring when said annulus is interseamed with said stack inside of said space.

2. A fixture for a stack of cladmetal layers to be brazed together by heat under atmospheric pressure for flexing at least one layer on the end of said stack of layers to cause it to conform to the other during the brazing, said fixture comprising superimposed interspaced diaphragms, each made of sheet metal of a sufficiently light gauge to be flexible under atmospheric pressure, the outer peripheral portions of said diaphragms being formed so that they approach each other radially outwardly until they intercontact directly, each of said peripheral portions extending outwardly far enough while they intercontact to form an interseaming area in the form of an annulus, a metal ring being located between the diaphragms adjacent to said peripheral portions and having a thickness substantially equalling said stack and having flat end surfaces strutting said diaphragms apart, and means for withdrawing air from the space between said diaphragms within said ring when said annulus is interseamed with said stack inside of said space, said means comprising a conduit having an opening and means for engaging said conduit's opening air-tightly with the outer face of one of said diaphragms in registration with one of the ring's said flat end surfaces, said one diaphragm and said ring being formed to provide cooperatively a conduit leading from said space to said conduit's opening.

References Cited in the file of this patent

UNITED STATES PATENTS

| | | |
|---|---|---|
| 2,059,584 | Johnson | Nov. 3, 1936 |
| 2,154,273 | Kollsman | Apr. 11, 1939 |
| 2,160,558 | Orr | May 30, 1939 |
| 2,227,295 | Cope | Dec. 31, 1940 |
| 2,713,196 | Brown | July 19, 1955 |
| 2,773,302 | Watson | Dec. 11, 1956 |

UNITED STATES PATENT OFFICE
CERTIFICATE OF CORRECTION

Patent No. 2,881,728                                              April 14, 1959

Lester C. Morton et al.

It is hereby certified that error appears in the printed specification of the above numbered patent requiring correction and that the said Letters Patent should read as corrected below.

Column 5, lines 38 and 39, strike out "while said peripheral portions extending outwardly far enough".

Signed and sealed this 18th day of August 1959.

(SEAL)
Attest:

KARL H. AXLINE
Attesting Officer

ROBERT C. WATSON
Commissioner of Patents